United States Patent
Zhu

(10) Patent No.: US 9,013,987 B2
(45) Date of Patent: Apr. 21, 2015

(54) METHOD FOR HANDLING LOCAL LINK CONGESTION AND APPARATUS

(75) Inventor: Lei Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 13/570,567

(22) Filed: Aug. 9, 2012

(65) Prior Publication Data

US 2012/0307634 A1 Dec. 6, 2012

Related U.S. Application Data

(63) Continuation of application No. PCT/CN2011/070965, filed on Feb. 12, 2011.

(30) Foreign Application Priority Data

Feb. 12, 2010 (CN) .......................... 2010 1 0116463

(51) Int. Cl.
*H04L 1/00* (2006.01)
*H04W 28/02* (2009.01)
*H04L 12/825* (2013.01)

(52) U.S. Cl.
CPC .......... *H04W 28/02* (2013.01); *H04W 28/0205* (2013.01); *H04L 47/26* (2013.01)

(58) Field of Classification Search
CPC ..... H04W 74/08; H04W 88/08; H04W 80/04; H04W 84/18; H04W 84/12; H04L 12/413; H04L 47/27; H04L 47/70; H04L 47/2441; H04L 47/15; H04L 47/12; H04L 47/11; H04L 47/30; H04L 47/10
USPC .............. 370/229, 230, 230.1, 236, 232–235, 370/338, 455; 455/453, 422.3
See application file for complete search history.

(56) References Cited

U.S. PATENT DOCUMENTS

2006/0050641 A1 3/2006 Brown et al.
2006/0126509 A1 6/2006 Abi-Nassif et al.
(Continued)

FOREIGN PATENT DOCUMENTS

CN 101116293 A 1/2008
CN 101188611 A 5/2008
(Continued)

OTHER PUBLICATIONS

Chang-biao Xu, "Improving Performance of TCP Applied in Wireless Environment by Ameliorating Explicit Congestion Notification", Oct. 19, 2000, pp. 61-64.
Rui Li et al, "Enchancing Performance using ECN and ELN in Wireless Network", 2007, pp. 159-161.
M. Westerlund et al., "Explicit Congestion Notification (ECN) for RTP over UDP", Oct. 26, 2009, pp. 1-45.
(Continued)

*Primary Examiner* — Dady Chery
(74) *Attorney, Agent, or Firm* — Staas & Halsey LLP

(57) ABSTRACT

The present invention relates to the field of congestion control, and discloses a method for handling local link congestion and an apparatus. The method includes: negotiating, by a local link control entity, a local congestion notification capability with a local terminal; setting, by the local link control entity, a congestion identifier in a downlink data packet corresponding to the local congestion notification capability when a local link is congested between the local link control entity and the local terminal; and performing, by the local link control entity, congestion control on the local link, or performing, by the local terminal, congestion control on the local link according to the congestion identifier. The apparatus includes a local link control entity and a terminal device.

10 Claims, 13 Drawing Sheets

(56) References Cited

U.S. PATENT DOCUMENTS

| | | |
|---|---|---|
| 2006/0176810 A1 | 8/2006 | Kekki |
| 2008/0162028 A1 | 7/2008 | Satoh |
| 2009/0067335 A1 | 3/2009 | Pelletier et al. |
| 2010/0238805 A1* | 9/2010 | Ludwig et al. ............ 370/236 |
| 2011/0080831 A1 | 4/2011 | Ludwig et al. |

FOREIGN PATENT DOCUMENTS

| | | |
|---|---|---|
| CN | 101997644 A | 3/2011 |
| EP | 0606282 B1 | 7/1998 |
| WO | WO 2009/024596 A1 | 2/2009 |

OTHER PUBLICATIONS

International Search Report mailed May 26, 2011, issued in corresponding PCT Patent Application No. PCT/CN2011/070965.

Extended European Search Report dated Feb. 20, 2013, issued in corresponding European Patent Application No. 11741923.4.

Written Opinion of the International Searching Authority, dated May 26, 2011, in corresponding International Application No. PCT/CN2011/070965 (6 pp.).

Chinese Office Action mailed Feb. 20, 2013 for corresponding Chinese Application No. 201010116463.6.

International Search Report of PCT/CN2011/070965 mailed May 26, 2011.

* cited by examiner

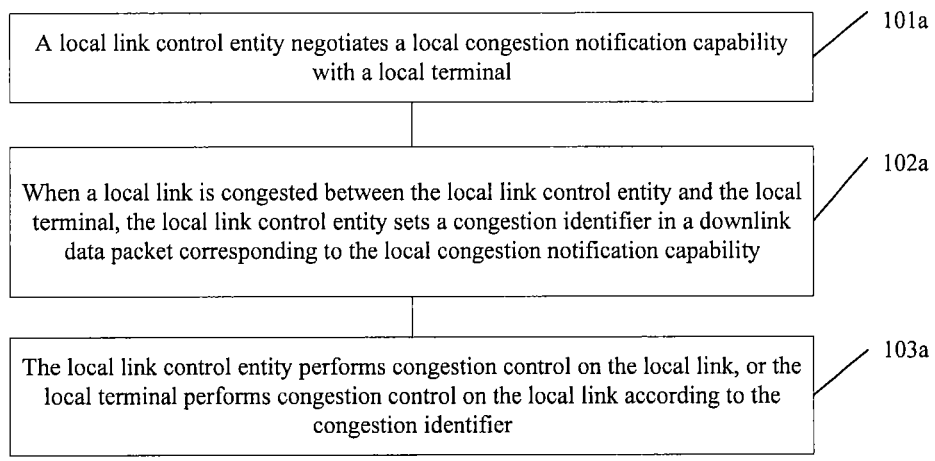
FIG. 1-a
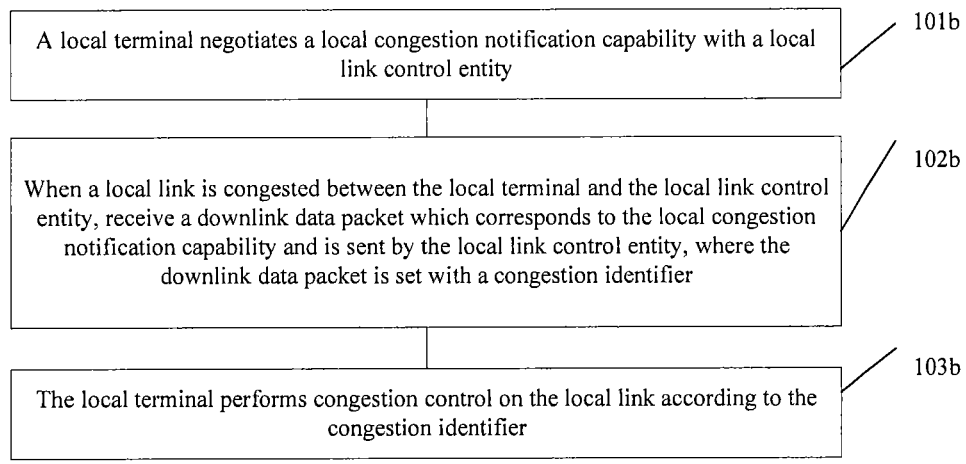
FIG. 1-b

| 0 1 2 3 4 5 6 7 8 9 0 1 2 3 4 5 6 7 8 9 0 1 2 3 4 5 6 7 8 9 0 1 |
|---|
| Regular RTCP XR header (extension header of a regular real-time transport protocol) |
| SSRC of Media Sender (synchronization source identifier of a media sender) |

| CE Counter (congestion experienced counter) | not-ECT Counter (not-explicit congestion notification capable transport counter) |
|---|---|
| ECT (0) Counter (explicit congestion notification capable transport non-congestion counter) | ECT (1) Counter (explicit congestion notification capable transport congestion counter) |

FIG. 4

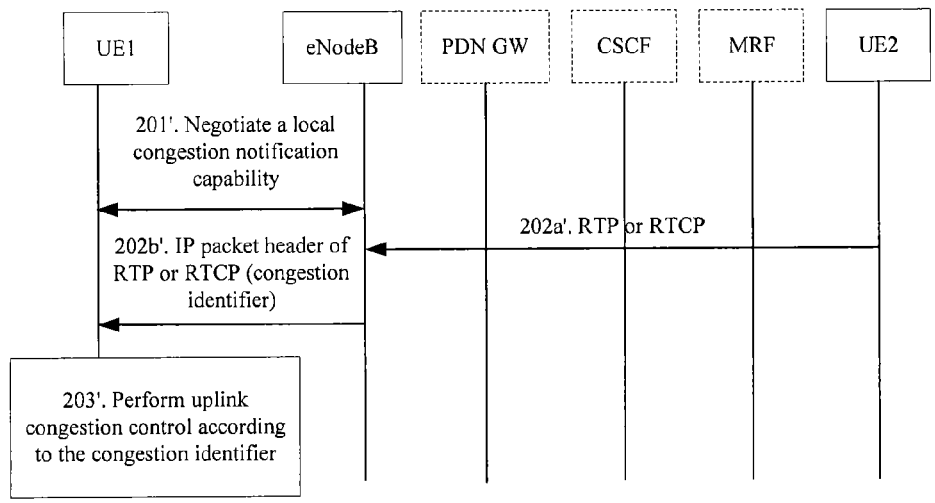

| Version (version) | IHL (IP packet header length) | Type of Service (type of service) | Total Length (total length) |||
|---|---|---|---|---|---|
| Identification (identifier) ||| Flags (flags) | Fragment Offset (fragment offset) ||
| Time to Live (time to live) | Protocol (protocol number) || Header Checksum (header checksum) |||
| Source Address (source address) |||||| 
| Destination Address (destination address) ||||||
| Options (options) ||||| Padding (padding) |

| Option Type (option type) | Opt Data Len (option data length) | Option Data (option data) ... |
|---|---|---|

| Option Type (option type) = 33 | Opt Data Len (option data length) = N-2 | Option Data (option data) = 1 (N-2 bytes) ... |
|---|---|---|

| Option Type (option type) = 33 | Opt Data Len (option data length) = N-2 | Option Data (option data) .. = 0 (N-2 bytes) |
|---|---|---|

| DSCP (differential service code point) | ECT (explicit congestion notification capable transport) |
|---|---|

| Source Port (source port) | | | | | | | | | | | Destination Port (destination port) |
|---|---|---|---|---|---|---|---|---|---|---|---|
| Sequence Number (sequence number) | | | | | | | | | | | |
| Acknowledgment Number (acknowledgement number) | | | | | | | | | | | |
| Header length (header length) | Reserved (reserved) | CWR (identifier of congestion window reduced) | ECE (explicit congestion notification echo) | URG (urgent pointer bit flag) | ACK (response) | PSH (buffer data transmission flag) | RST (connection reset) | SYN(set up connection) | FIN (close connection) | | Window (window) |
| Checksum (checksum) | | | | | | | | | | | Urgent Pointer (urgent pointer) |
| Options (options) | | | | | | | | | | | Padding (padding) |
| Data (data) | | | | | | | | | | | |

FIG. 15

METHOD FOR HANDLING LOCAL LINK CONGESTION AND APPARATUS

CROSS-REFERENCE TO RELATED APPLICATIONS

This application is a continuation of International Application No. PCT/CN2011/070965, filed on Feb. 12, 2011, which claims priority to Chinese Patent Application No. 201010116463.6, filed on Feb. 12, 2010, both of which are hereby incorporated by reference in their entireties.

FIELD OF THE INVENTION

The present invention relates to the field of congestion control, and in particular, to a method for handling local link congestion and an apparatus.

BACKGROUND OF THE INVENTION

In a wireless communication network, local resources such as air interface resources are highly limited, and congestion is easy to occur. Therefore, it is necessary to put forward an effective method to solve a problem of local congestion.

An ECN (Explicit Congestion Notification, explicit congestion notification) mechanism is available in the prior art for overcoming the problem of congestion. The working procedure of the ECN mechanism is: A sender (or referred to as a local terminal) negotiates an ECN capability with a receiver (or referred to as a remote terminal), and then the sender sends a data packet. After receiving the data packet, a network node sets ECT (ECN Capable Transport, ECN capable transport) as "experiencing congestion" if it is experiencing congestion, and then forwards the set data packet. Finally, after the receiver receives the data packet, if the ECT is "experiencing congestion", the receiver sets a flag bit ECE (ECN Echo, ECN echo), notifying the sender that it has received the data packet of "experiencing congestion". After receiving this data packet, the sender sets a flag bit CWR (Congestion Window Reduce, congestion window reduced), notifying the receiver that it has reduced a congestion window.

The existing ECN mechanism is an end-to-end congestion notification mechanism, which strongly depends on support of the network node and the remote terminal for an ECN function. If the existing end-to-end ECN mechanism is used to solve a problem of air interface congestion, once the network node or remote terminal does not support the ECN mechanism, the ECN flag may be discarded, or even the whole IP packet may be discarded, which causes failure of the ECN mechanism and therefore the problem of local congestion cannot be solved.

SUMMARY OF THE INVENTION

In order to free an ECN mechanism from depending on a network node and a remote terminal, enable a congestion notification function to be implemented only on network congestion of a local link, and thereby solving a problem of local congestion in a radio access network more efficiently, embodiments of the present invention provide a method for handling local link congestion and an apparatus. The technical solutions are as follows:

A method for handling local link congestion, where the method includes:

negotiating, by a local link control entity, a local congestion notification capability with a local terminal;

when a local link is congested between the local link control entity and the local terminal, setting, by the local link control entity, a congestion identifier in a downlink data packet corresponding to the local congestion notification capability; and performing, by the local link control entity, congestion control on the local link.

A method for handling local link congestion, where the method includes:

negotiating, by a local terminal, a local congestion notification capability with a local link control entity;

receiving a downlink data packet which corresponds to the local congestion notification capability and is sent by the local link control entity when a local link is congested between the local terminal and the local link control entity, where the downlink data packet is set with a congestion identifier; and performing, by the local terminal, congestion control on the local link according to the congestion identifier.

A local link control entity, where the local link control entity includes:

a negotiating module, configured to negotiate a local congestion notification capability with a local terminal;

a setting module, configured to, when a local link to the local terminal is congested, set a congestion identifier in a downlink data packet, where the data packet corresponds to the local congestion notification capability that is negotiated by the negotiating module; and a control module, configured to perform congestion control on the local link.

A terminal device, where the terminal includes:

a negotiating module, configured to negotiate a local congestion notification capability with a local link control entity;

a receiving module, configured to receive a downlink data packet which corresponds to the local congestion notification capability and is sent by the local link control entity when a local link to the local link control entity is congested, where the downlink data packet is set with a congestion identifier; and a control module, configured to perform congestion control on the local link according to the congestion identifier.

The technical solutions provided by the embodiments of the present invention bring the following beneficial effects:

The local link control entity negotiates the local congestion notification capability with the local terminal; when the local link is congested between the local link control entity and the local terminal, the local link control entity sets the congestion identifier in the downlink data packet corresponding to the local congestion notification capability, and performs congestion control according to the congestion identifier. In this way, an end-to-end congestion notification mechanism is freed from dependence on the network node or the remote terminal, the congestion notification mechanism can work all the time, and the problem of local congestion is solved more effectively.

BRIEF DESCRIPTION OF THE DRAWINGS

FIG. 1-*a* is a flowchart of a method for handling local link congestion according to Embodiment 1 of the present invention;

FIG. 1-*b* is a flowchart of another method for handling local link congestion according to Embodiment 1 of the present invention;

FIG. 4 is a schematic diagram of a format of an RTCP packet, where the packet is added with a congestion identifier according to Embodiment 2 of the present invention;

FIG. 5 is another information interaction diagram of controlling uplink congestion of RTP according to Embodiment 2 of the present invention;

FIG. 6 is a schematic diagram of an IPv4 packet header format according to Embodiment 2 of the present invention;

FIG. 8 is a schematic diagram of an Option format according to Embodiment 2 of the present invention;

FIG. 9 is a schematic diagram of an uplink traffic congestion Option format according to Embodiment 2 of the present invention;

FIG. 10 is a schematic diagram of a downlink traffic congestion Option format according to Embodiment 2 of the present invention;

FIG. 11 is a schematic diagram of a congestion identifier of a TOS domain or Traffic Class domain according to Embodiment 2 of the present invention;

FIG. 15 is a schematic diagram of a TCP ACK format according to Embodiment 3 of the present invention;

DETAILED DESCRIPTION OF THE EMBODIMENTS

Figure 2:
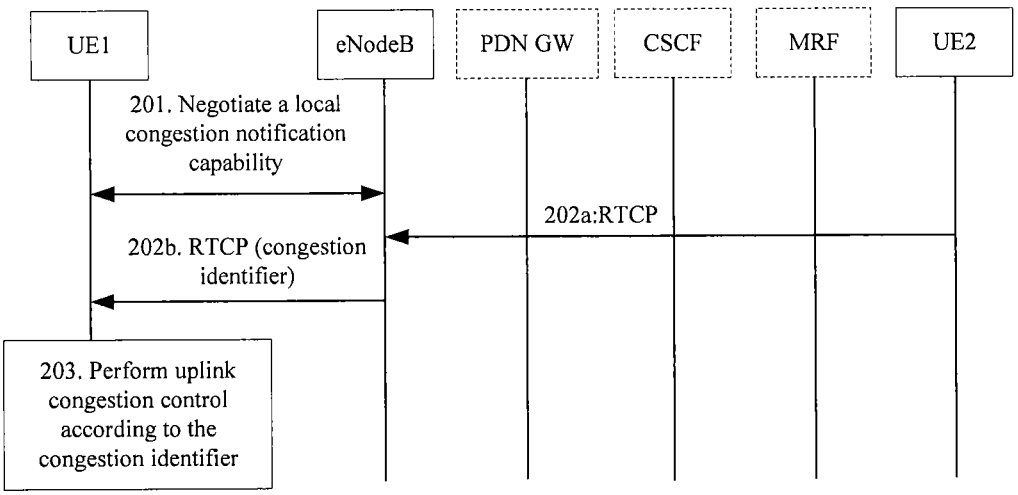
FIG. 2 is an information interaction diagram of controlling uplink congestion of RTP according to Embodiment 2 of the present invention.

To make the objectives, technical solutions, and merits of the present invention clearer, the following describes the embodiments of the present invention in detail with reference to the accompanying drawings.

Embodiment 1

As shown in FIG. 1-a, this embodiment provides a method for handling local link congestion. The method includes:

101a. A local link control entity negotiates a local congestion notification capability with a local terminal.

The local congestion notification capability includes: capabilities of supporting all local congestion mechanisms such as IP packet, RTP, VoIP (Voice over Internet Protocol, voice over Internet protocol), IMS (IP Multimedia Subsystem, IP multimedia subsystem) call, TCP, HTTP, FTP (File Transfer Protocol, file transfer protocol), DCCP (Datagram Congestion Control Protocol, datagram congestion control protocol), P2P (Peer to Peer, peer to peer), and so on. The RTP is generally carried over a UDP transport protocol. Therefore, the RTP protocol adopts a local congestion notification method independent of the transport protocol. A transport layer of the P2P generally uses UDP. The UDP in P2P may carry application protocols such as RTP or HTTP. Therefore, congestion control of the P2P service may be performed by using the methods provided in Embodiment 2 and Embodiment 3.

A Local link includes a radio access network link, such as GSM (Global System for Mobile Communications, global system for mobile communications), WCDMA (Wideband Code Division Multiple Access, wideband code division multiple access)/UMTS (Universal Mobile Telecommunications System, universal mobile telecommunications system), LTE, CDMA1X/EVDO (Evolution Data Optimized, evolution data optimized), Wimax (Worldwide Interoperability for Microwave Access, worldwide interoperability for microwave access), WLAN (Wireless Local Area Network, wireless local area network), and an air interface link of a satellite; and may also include a fixed access network link such as xDSL (Digital Subscriber Line, digital subscriber line), PPP (Point-to-Point Protocol, point-to-point protocol), and an FR (Frame Relay, frame relay) TDM (Time Division Multiplex, time division multiplex) access link. The method provided in this embodiment can be implemented in combination with the foregoing local access links. Correspondingly, the local link control entity includes an RNC (Radio Network Controller, air interface network controller) in a UMTS system, an AP (Access Point, access point) in a Wimax system, a DSLAM (Digital Subscriber Line Access Multiplexer, digital subscriber line access multiplexer), an eNodeB (evolved Node B, evolved NodeB) in an LTE system, and so on.

102a. When a local link is congested between the local link control entity and the local terminal, the local link control entity sets a congestion identifier in a downlink data packet corresponding to the local congestion notification capability.

When the local link control entity performs local congestion control, the congestion identifier is used to let the local terminal know congestion of the local link. When the local terminal is needed to perform the congestion control, the congestion identifier is used to let the local terminal know the congestion of the local link and perform congestion control.

103a. The local link control entity performs the congestion control on the local link, or the local terminal performs the congestion control on the local link according to the congestion identifier.

Specifically, when an uplink from the local terminal to the local link control entity is congested, the local link control entity sets the congestion identifier in a specific downlink data packet, and the local terminal adjusts a transmitting rate according to the received congestion identifier; when a downlink from the local link control entity to the local terminal is congested, the local link control entity sets the congestion identifier in a specific downlink data packet, and a radio access network entity performs downlink congestion control by increasing a buffer, or, the local terminal performs downlink congestion control by using code rate adaptation and transcoding with a media function entity according to the received congestion identifier.

Correspondingly, as shown in FIG. 1-b, this embodiment provides a method for handling local link congestion. The method includes:

101b. A local terminal negotiates a local congestion notification capability with a local link control entity.

102b. When a local link is congested between the local terminal and the local link control entity, receive a downlink data packet which corresponds to the local congestion notification capability and is sent by the local link control entity, where the downlink data packet is set with a congestion identifier.

103b. The local terminal performs congestion control on the local link according to the congestion identifier.

By using the method provided in this embodiment, the local link control entity negotiates the local congestion notification capability with the local terminal; when the local link is congested between the local link control entity and the local terminal, the local link control entity sets the congestion identifier in the downlink data packet corresponding to the local congestion notification capability, and performs congestion control according to the congestion identifier. In this way, an end-to-end congestion notification mechanism is freed from dependence on a network node or a remote terminal, the congestion notification mechanism can work all the time, and a problem of local congestion is solved more effectively.

The method for handling local link congestion in this embodiment is applicable to various wireless communication networks. In the description of the subsequent embodiments, a communication network of a 3GPP (3rd Generation Partnership Project, 3rd generation partnership project) LTE (Long Term Evolution, long term evolution) architecture is taken as an example. The local link control entity in an LTE network is an eNodeB (evolved Node B, evolved NodeB), the local terminal is set as a UE 1 (User Equipment, user equipment), the remote terminal is set as an UE 2, and a link between the UE 1 and the eNodeB is called a local link. The following takes an RTP (Real-time Transport Protocol, real-time transport protocol) and a TCP (Transmission Control Protocol, transmission control protocol)-based HTTP (Hypertext Transfer Protocol, hypertext transfer protocol) application, respectively, as examples to describe the method for handling local link congestion. Other local congestion notifications are similar to those of the RTP and HTTP except that the data packet carrying the congestion identifier is different, which are not repeatedly described one by one here.

Embodiment 2

This embodiment provides a method for handling local link congestion. This method is intended for a case that an RTP congestion notification mechanism is supported and an end-to-end congestion notification solution is not implemented.

As shown in FIG. 2, for an uplink direction from a UE 1 to an eNodeB, this embodiment provides two congestion control methods. The first uplink congestion control method is as follows:

201. An eNodeB negotiates a local congestion notification capability with a UE 1.

Figure 3:
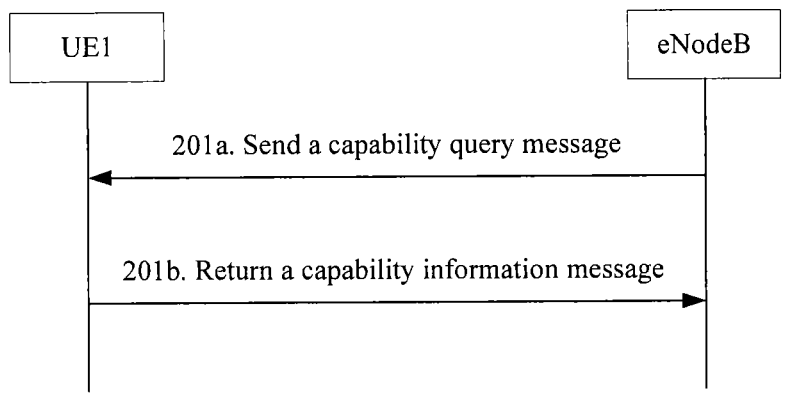
FIG. 3 is an information interaction diagram of negotiating congestion notification according to Embodiment 2 of the present invention.

As shown in FIG. 3, at least the following negotiation method may be adopted when the eNodeB negotiates the local congestion notification capability with the UE 1:

201a. The eNodeB sends a capability query UECapabilityEnquiry message to the UE 1.

The capability query message may include the congestion notification capability supported by the eNodeB, for example, capabilities of supporting all local congestion notification mechanisms such as IP packet, RTP, VoIP, IMS call, TCP, HTTP, FTP, DCCP or P2P (Peer to Peer, peer to peer), and so on. In a practical application, UE access network capability query information may include the various foregoing congestion notification capabilities listed which are supported by the eNodeB, and the various foregoing capabilities may be set as a Boolean (Boolean) type. If a local congestion notification capability is supported by the UE 1, its corresponding Boolean type may be set to true; if not supported, its corresponding Boolean type may be set to false.

201b. The UE 1 returns a corresponding capability information UECapabilityInfomation message.

Specifically, the UE 1 determines the local congestion notification capability according to the congestion notification capabilities supported by the eNodeB and itself. In this embodiment, at least the capability of supporting the RTP congestion notification mechanism is included.

202a. The eNodeB receives an RTCP (Real-time Control Protocol, real-time transport control protocol) packet sent by a UE 2.

202b. When an uplink is congested, the eNodeB adds a congestion identifier ECT (1) Counter into the downlink RTCP packet, and sends it to the UE 1.

The downlink RTCP packet may be sent by the remote terminal UE 2 to the eNodeB through an entity such as a PDN (Packet Data Network, packet data network) GW (Gateway, gateway), a CSCF (Call Session Control Function, call session control function), an MRF (Media Resource Function, media resource function), and so on. A specific transmission approach is not limited in this embodiment.

As shown in FIG. 4, a congestion identifier is added into an RTCP packet, where the bold font indicates the added congestion identifier. Meanings of the symbols are as follows:

Regular RTCP XR header (extension header of a regular real-time transport control protocol);

SSRC of Media Sender (synchronization source identifier of a media sender);

CE Counter (Congestion Experienced Counter, congestion experienced counter): indicates the number of RTP packets received by the eNodeB after the UE 2 joins an RTP session;

ECT (0) Counter (explicit congestion notification capable transport non-congestion counter): indicates the number of RTP packets received by the eNodeB after the UE 2 receives an ECN value marked as 0, where that is, the UE 2 receives a non-congestion indication;

ECT (1) Counter (not-explicit congestion notification capable transport congestion counter): indicates the number of RTP packets received by the eNodeB after the UE 2 receives an ECN value marked as 1, where that is, the UE 2 receives a congestion indication; and not-ECT Counter (not-explicit congestion notification capable transport counter): indicates the number of RTP packets received by the eNodeB after the UE 2 receives an ECN value not-ECT, where that is, the UE 2 receives an indication of not supporting the ECN.

A name of each field in the congestion identifier shown in FIG. 4 is not limited in this embodiment.

In the foregoing procedure, the eNodeB needs to parse an RTCP packet header to discover the congestion identifier in the RTCP packet. In this embodiment, a port number of the RTCP is set to a value of 1 plus a port number of a current RTP data stream. An RTP packet may be identified when the RTP data stream performs IP header compression, and therefore, a protocol port number of the RTP packet is selected from the RTP data stream, and the corresponding RTCP packet may be detected by detecting the corresponding RTCP packet on the port number equivalent to 1 plus the selected port number. A local congestion indication in an extension field of the RTCP packet header may be extracted from the corresponding RTCP packet.

203. The UE 1 performs uplink congestion control according to the received congestion identifier. In a practical application, at least the following two methods may be adopted:

Method 1: The local terminal UE 1 directly reduces a media sending rate. Method 2: The local terminal UE 1 sends a media parameter modification request to the remote terminal UE 2, and changes the media sending rate through a media parameter modification procedure.

Taking FIG. 4 as an example, the UE 1 does not care about a specific value of the counter, but only needs to detect which counter has a non-zero flag bit. For example, if a flag bit of the ECT (1) Counter is non-zero, it indicates link congestion, and the sending rate needs to be adjusted.

For the uplink direction from the UE 1 to the eNodeB, the second uplink congestion control method is as shown in FIG. 5. A specific setting procedure and a packet format are as follows:

201'. The eNodeB negotiates a local congestion notification capability with the UE 1, where the step is the same as step 201, which is not repeatedly described here.

202a'. The eNodeB receives an RTP packet or RTCP packet sent by the UE 2.

202b'. A congestion identifier is set in an IP packet header of the received downlink RTP packet or RTCP packet when the uplink is congested.

Figure 7:
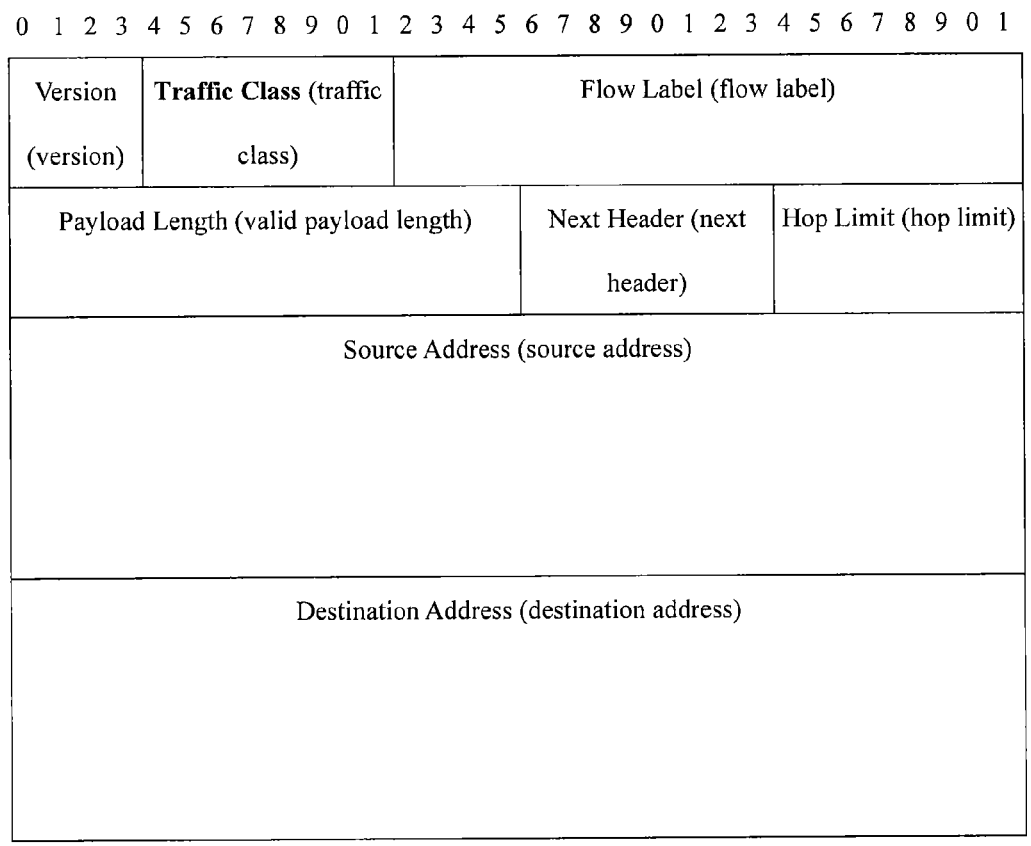
FIG. 7 is a schematic diagram of an IPv6 packet header format according to Embodiment 2 of the present invention.

Specifically, in an IPv4 packet header format shown in FIG. 6, the eNodeB sets a congestion identifier in a TOS (Type of Service, quality of service) domain of the IPv4 packet header, or sets a congestion identifier in a Traffic Class domain of an IPv6 packet header shown in FIG. 7, and the uplink traffic is differentiated from the downlink traffic in the options domain.

The options field of the IPV6 is different from that of the ipv4. The options field is not in a basic packet header, but is in two extension headers: a hop by hop option header (hop by hop option header) and a destination options header (destination options header).

See the options format shown in FIG. 8. The fields are:

Option Type (option type): This field is an 8-bit identifier and indicates the type of the option;

Opt Data Len (option data length): This field is an 8-bit integer and indicates length of the option data field. The maximum value of the field is 255, and the unit of the field is byte.

Option Data (option data): This field is a specific data value related to the option, and the maximum length of this field is 255 bytes.

The meanings of certain bytes of the option field may differ in ipv4 and ipv6, but the uplink traffic can still be differentiated from the downlink traffic uniformly by using the same extending manner. For example, the option type may be extended to 00100001, the option data length depends on a padding need of the data packet. In the option field shown in FIG. 9, the option data is extended to 1, indicating uplink traffic; in the option field shown in FIG. 10, the option data is extended to 0 or null, indicating downlink traffic. This embodiment only use an example for illustration, and the option type and the option data may be set to other values. In the illustrated values, N is a positive integer, and its value is appropriate if the value ensures that the length of the whole data packet is 32 bits.

Besides, the TOS domain or the Traffic Class domain is used to indicate congestion. As shown in FIG. 11, a preset value of DSCP (Differentiated Services Code Point, differentiated services code point) and a preset value of ECT (ECN Capable Transport, explicit congestion transport capable transport) may be marked in two flag bits of an ECT field of the TOS domain or the Traffic Class domain. For example, a value 11 indicates that congestion is underway.

203'. The UE 1 performs uplink congestion control according to the received congestion identifier. A specific implementation method is the same as step 203, which is not repeatedly described here.

Figure 12:
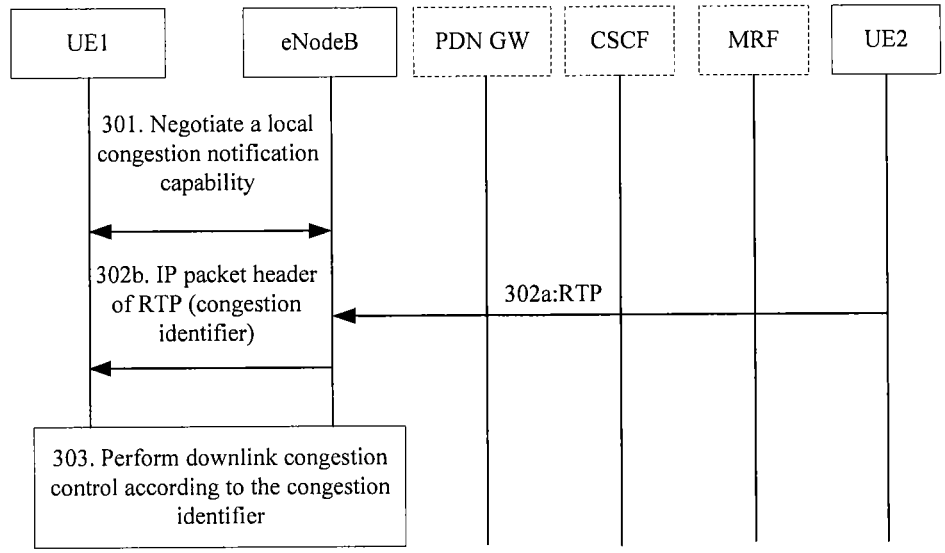
FIG. 12 is an information interaction diagram of controlling downlink congestion of RTP according to Embodiment 2 of the present invention.

As shown in FIG. 12, for a downlink direction from the eNodeB to the UE 1, a method of downlink congestion control is to add a congestion identifier into a downlink RTP packet header, which is described specifically below:

301. The eNodeB negotiates a local congestion notification capability with the UE 1, where this step is the same as step 201, which is not repeatedly describe here.

302a. The eNodeB receives an RTP packet sent by a UE 2.

302b. The eNodeB adds a congestion identifier into the IP packet header of the downlink RTP packet when the downlink is congested.

Specifically, an ECT is added into the TOS domain of the IPv4 packet header, or is added into the Traffic Class domain of the IPv6 packet header of the downlink RTP packet. The ECT is set to experiencing congestion, for example, set to 11. A downlink traffic identifier is set in the Options field or the field is set to null.

303. Downlink congestion control is performed according to the congestion identifier. In a practical application, at least the following three downlink congestion control methods may be adopted:

Method 1: The local link control entity performs downlink congestion control by increasing the buffer when the local link is congested between the local link control entity and the local terminal; or Method 2: When the downlink local link is congested between the local link control entity and the local terminal, the local link control entity sends the congestion identifier to the local terminal, and the local terminal requests a remote terminal to modify a media parameter to adjust the media sending rate of the remote terminal; or Method 3: When the downlink local link is congested between the local link control entity and the local terminal, the local link control entity sends the congestion identifier to the local terminal, and the local terminal requests a local media function entity to modify the media parameter of media sent by the remote terminal, so as to adjust the media sending rate of the remote terminal.

The media function entity may be a MGW (Media Gateway, media gateway) or MRF (Media Resource Function, media resource function), and the MRF includes an MRFC (Multimedia Resource Function Control, multimedia resource function control) and an MRFP (Multimedia Resource Function Processor, multimedia resource function processor).

Figure 13:
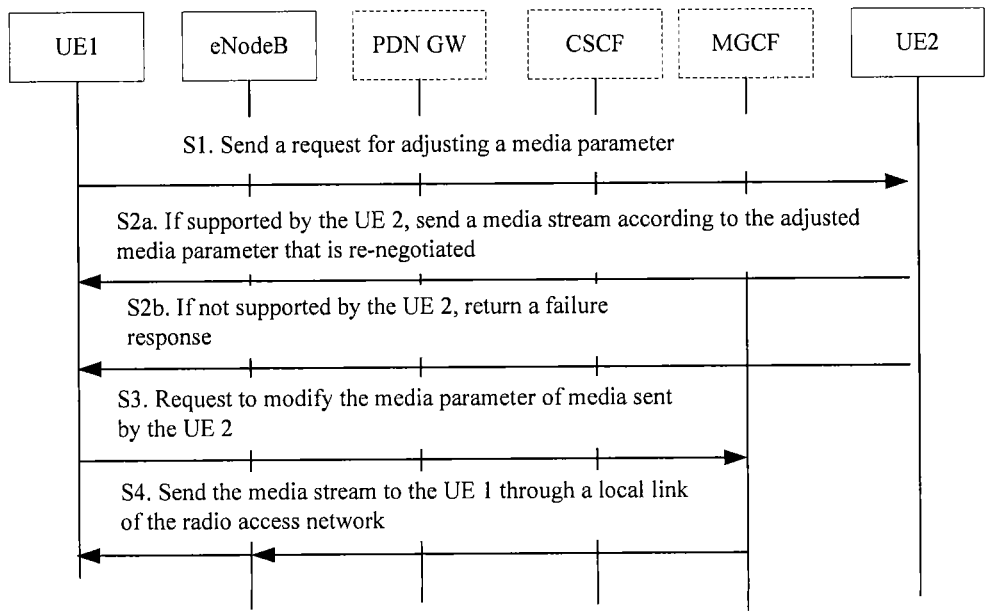
FIG. 13 is an information interaction diagram of controlling congestion by using a media function entity according to Embodiment 2 of the present invention.

Method 2 and method 3 may be implemented separately, or implemented together. When they are implemented together, a sequence is not limited. The following only takes one application scenario as an example for description, which is as shown in FIG. 13:

S1. After the local terminal (the UE 1) receives the RTP packet that has a local congestion notification from the eNodeB, the UE 1 sends a media parameter adjustment request to the remote terminal (the UE 2). An adjusted media parameter includes parameters such as a codec rate (coding rate) and a codec (coding format).

S2a: If the UE 2 supports the media parameter requested by UE 1, the media parameter is negotiated successfully, and the UE 1 and the UE 2 send media streams according to the adjusted media parameter that is re-negotiated.

S2b. If the UE 2 does not support the media parameter requested by the local UE 1, the negotiation fails, and a failure response is returned to the UE 1.

S3. The UE 1 requests an MGCF to modify the media parameter of the media sent by the UE 2. The MGCF invokes the MGW to convert different media parameters, that is, adjusts the media sending rate of the UE 2 through conversion by the MGW.

S4. The MGCF sends the media stream to the local UE 1 through the local link of the radio access network according to the modified media parameter.

By using the method provided in this embodiment, the local link control entity negotiates the local congestion notification capability with the local terminal; when the local link is congested between the local link control entity and the local terminal, the local link control entity sets the congestion identifier in the downlink data packet corresponding to the local congestion notification capability, and performs congestion control according to the congestion identifier. In this way, the end-to-end congestion notification mechanism is freed from dependence on a network node or the remote terminal, the congestion notification mechanism can work all the time, and a problem of local congestion is solved more effectively. Moreover, the downlink congestion control is performed by the media function entity or local link control entity, thereby reducing dependence on a coding capability of the remote terminal.

Embodiment 3

This embodiment provides a method for handling local link congestion. This method is described by taking a case that a certain application HTTP, which uses TCP as a transport protocol, as an example. In this case, a local link control entity can identify an HTTP service data packet according to a port number of a port through which HTTP traffic passes, or identify the data packet as the HTTP service data packet according to a parameter in a Protocol field in an IP packet header.

Figure 14:
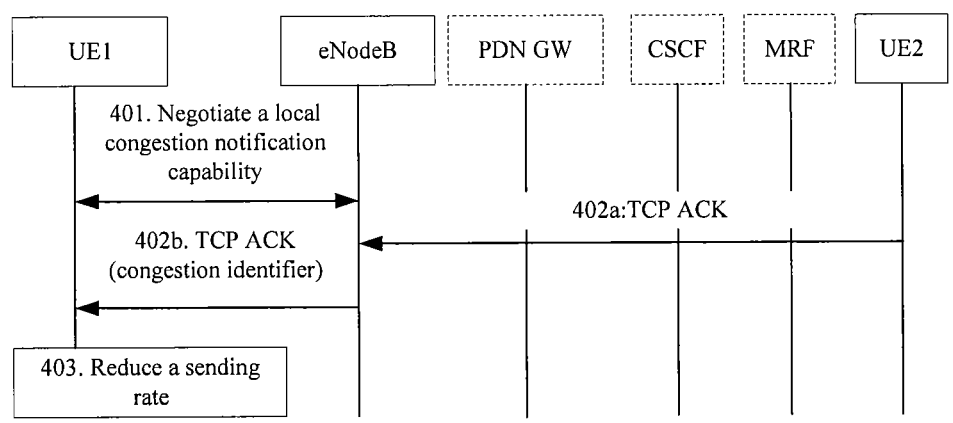
FIG. 14 is an information interaction diagram of controlling uplink congestion of HTTP according to Embodiment 3 of the present invention.

As shown in FIG. 14, in an uplink direction from a UE 1 to an eNodeB, the method for handling local link congestion specifically includes:

401. An eNodeB negotiates a local congestion notification capability with a UE 1. The negotiation procedure is the same as step 201, which is not repeatedly described here.

402a. The eNodeB receives a TCP ACK (acknowledgement) data packet sent by a UE 2.

402b. Upon detecting uplink congestion, the eNodeB adds a congestion identifier into the downlink TCP ACK packet, and sends the packet to the UE 1.

See the TCP ACK format shown in FIG. 15. A specific method of adding a congestion identifier includes: The eNodeB sets an ECE field of the TCP ACK packet to experiencing congestion, for example, sets the ECE field to 1.

403. Upon receiving the TCP ACK packet in which the ECE field is marked as experiencing congestion, the UE 1 reduces a sending rate in a congestion control manner of the TCP transport protocol, for example, by reducing a congestion window.

Besides, the UE 1 may set a CWR flag in a TCP packet header field in next TCP packet, indicating that it has received a congestion indication.

Figure 16:
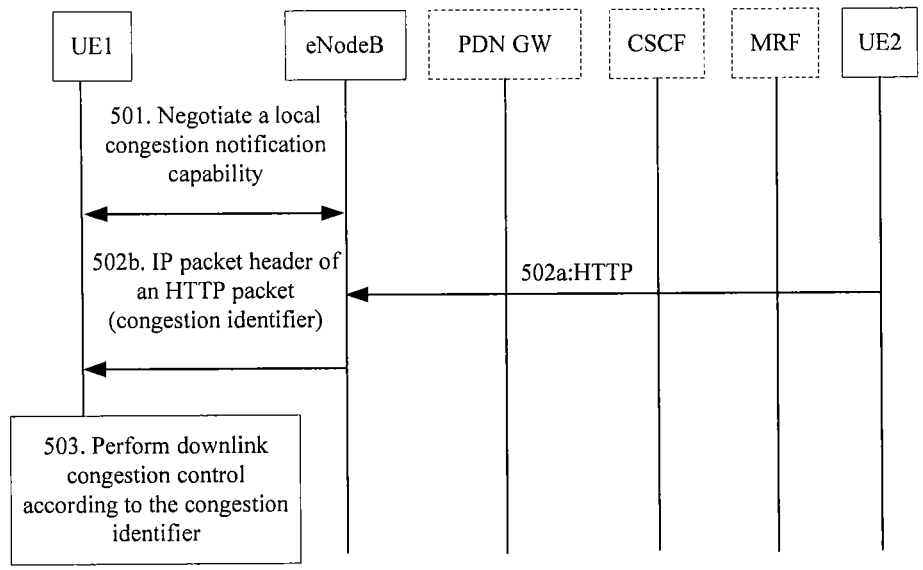
FIG. 16 is an information interaction diagram of controlling downlink congestion of HTTP according to Embodiment 3 of the present invention.

As shown in FIG. 16, in an downlink direction from the eNodeB to the UE 1, the method for handling local link congestion includes:

501. The eNodeB negotiates the local congestion notification capability with the UE 1. The negotiation procedure is the same as step 201, which is not repeatedly described here.

502a. The eNodeB receives an HTTP packet sent by the UE 2.

502b. The eNodeB adds a congestion identifier into an IP packet header of the downlink HTTP packet when the downlink is congested.

Specifically, an ECT is added into a TOS domain of an IPv4 packet header of the downlink HTTP packet, or an ECT is added into a Traffic Class domain of an IPv6 packet header of the downlink HTTP packet. The ECT is set to experiencing congestion. A downlink traffic identifier is set in an Options domain or the field is set to null.

503. The UE 1 performs downlink congestion control according to the congestion identifier. In a practical application, at least the following methods may be adopted:

Method 1: When the downlink local link is congested between the local link control entity and a local terminal, if an end-to-end congestion control mechanism is set up, the local terminal may add a congestion identifier into the TCP ACK packet. Upon receiving the congestion identifier, the remote terminal reduces the sending rate, for example, by reducing the TCP congestion window; or Method 2: When the downlink local link is congested between the local link control entity and the local terminal, if no end-to-end congestion control mechanism is set up, the local terminal reduces a TCP response rate to enable the remote terminal to reduce the sending rate.

By using the method provided in this embodiment, the local link control entity negotiates the local congestion notification capability with the local terminal; when the local link is congested between the local link control entity and the local terminal, the local link control entity sets the congestion identifier in the downlink data packet corresponding to the local congestion notification capability, and performs congestion control according to the congestion identifier. In this way, the end-to-end congestion notification mechanism is freed from dependence on a network node or the remote terminal, the congestion notification mechanism can work all the time, and a problem of local congestion is solved more effectively.

Embodiment 4

This embodiment provides a method for handling local link congestion. This method is intended for a case that an end-to-end congestion notification mechanism coexists with a local congestion notification mechanism.

If another network other than a local link is congested, and a congestion identifier is set by another network node or remote terminal into a data packet corresponding to a local congestion notification capability, the local link control entity does not set a congestion identifier in the data packet. The detailed process includes:

In an uplink direction from a UE 1 to an eNodeB: First, the UE 1 negotiates the local link congestion notification capability with the eNodeB. In the uplink direction, the UE 1 sends a media stream. In the local congestion notification mechanism, when the eNodeB detects that the local link is congested, taking RTCP as an example, which is not limited to the case of RTCP, the eNodeB adds a congestion identifier into an extension field of an RTCP packet header. As a radio access network control entity, the eNodeB adds a local congestion identifier into the RTCP packet header of the original RTCP packet after receiving an RTCP packet sent by a UE 2. After receiving the congestion identifier of the RTCP, the UE 1 performs congestion control on traffic in the uplink direction from the UE 1 to the eNodeB by adjusting its own sending rate. Meanwhile, in the end-to-end congestion notification mechanism, when congestion of the local link is detected between the UE 1 and the eNodeB, the congestion identifier also needs to be added in the RTCP packet. After receiving the RTCP packet that has the congestion identifier, the UE 1 performs the congestion control on the traffic in the uplink direction from the UE 1 to the eNodeB by adjusting its own sending rate. In this case, the UE 1 does not need to know whether a congestion indication is initiated by the local congestion notification mechanism or the end-to-end congestion notification mechanism, because both mechanisms have the same purpose of making the UE adjust the rate.

In a downlink direction from the eNodeB to the UE 1: When a end-to-end congestion notification solution is already set up, if the downlink between the eNodeB and the UE 1 is congested, the eNodeB adds a downlink local link congestion indication into an IP packet header of a downlink RTP packet. A congestion indication which is received by the UE 1 and is provided by another node in the network is the same as the congestion indication provided by the local radio access control entity. In this case, the remote UE 2 may be required to adjust a data sending speed through the end-to-end congestion notification mechanism. On condition that local radio access downlink congestion is differentiable, downlink congestion control may be performed by using the eNodeB or an MRF to perform code rate adaptation and transcoding. Meanwhile, in the end-to-end congestion notification mechanism, if network congestion is discovered, the congestion control is ended by using the remote UE 2 to perform rate control. In two cases that the end-to-end congestion notification scheme is set up or is not set up, the local link congestion notification mechanism in this embodiment may work without exception, and a conflict does not exist between the two procedures.

The method provided in this embodiment frees the congestion notification mechanism from depending on the network node or the remote terminal, and enables the congestion notification mechanism to work all the time, thereby solving a problem of the local congestion more effectively. Meanwhile, the method is well compatible with the end-to-end congestion notification mechanism, so that the two mechanisms can coexist and work harmoniously.

Embodiment 5

This embodiment provides a method for handling local link congestion. This method is implemented by extending RRC signaling between a UE 1 and an eNodeB.

Figure 17:
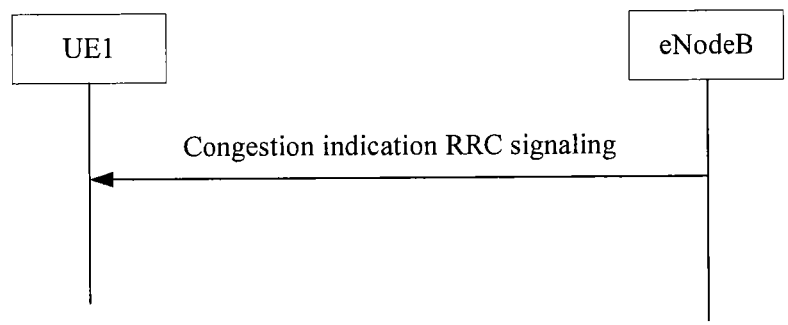
FIG. 17 is an information interaction diagram of controlling uplink congestion by using RRC signaling according to Embodiment 5 of the present invention.

In an uplink direction from the UE 1 to the eNodeB, the method for handling local link congestion specifically includes:

As shown in FIG. 17, the UE 1 sends a media stream. Upon detecting congestion of the uplink, the eNodeB notifies the UE 1 through congestion indication RRC signaling RRCCongestNotification between it and the UE 1. After receiving the congestion indication RRC signaling, the UE 1 performs congestion control correspondingly, for example, reduces a code rate, and adjusts a sending rate.

Figure 18:
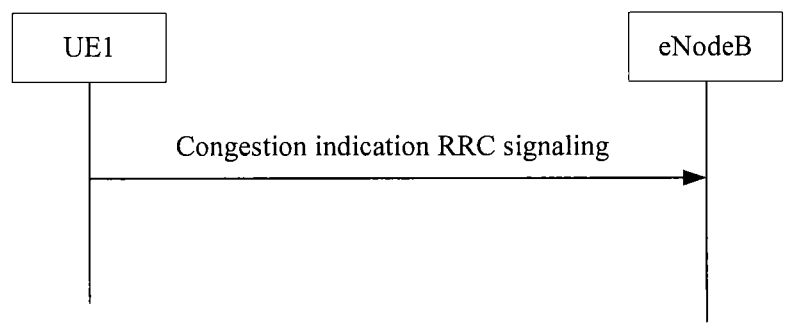
FIG. 18 is an information interaction diagram of controlling downlink congestion by using RRC signaling according to Embodiment 5 of the present invention.

In a downlink direction from the eNodeB to the UE 1, the method for handling local link congestion specifically includes:

As shown in FIG. 18, when the UE 1 detects downlink congestion, if the eNodeB supports a transcoding function or a codec adaptation function, the UE 1 notifies the eNodeB through the congestion indication RRC signaling, and then the eNodeB performs the congestion control. Specifically, a data transmission rate may be controlled within a time segment by increasing a buffer, thereby accomplishing a purpose of congestion control. When the eNodeB detects the congestion itself, if the eNodeB supports the transcoding function or codec adaptation, the downlink congestion control may be performed by using the foregoing method introduced; if the eNB does not support the transcoding function or codec adaptation function, for a IMS-based service, a media function entity (for example, an MGW or MRFP) may perform code rate adaptation and transcoding. Reference may be made to step 303 in Embodiment 2 for a specific procedure, which is not repeatedly described here.

By using the method provided in this embodiment, the congestion control is performed by using the congestion indication RRC signaling, and a congestion notification mechanism is freed from dependence on a network node or a remote terminal, and a congestion notification mechanism is enabled to work all the time, thereby solving a problem of a local congestion more effectively.

Embodiment 6

Figure 19:
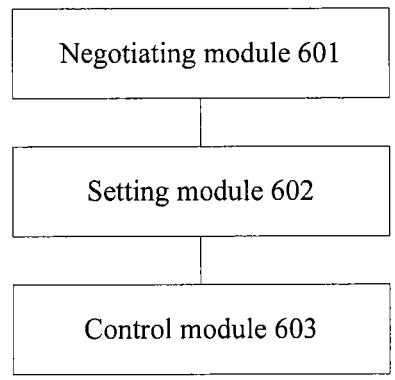
FIG. 19 is a schematic structural diagram of a local link control entity according to Embodiment 6 of the present invention.

As shown in FIG. 19, this embodiment provides a local link control entity, including:

a negotiating module 601, configured to negotiate a local congestion notification capability with a local terminal;

a setting module 602, configured to, when a local link to the local terminal is congested, set a congestion identifier in a downlink data packet, where the data packet corresponds to the local congestion notification capability that is negotiated by the negotiating module 601; and a control module 603, configured to perform congestion control on the local link, or enable the local terminal to perform the congestion control on the local link according to the congestion identifier.

Figure 20:
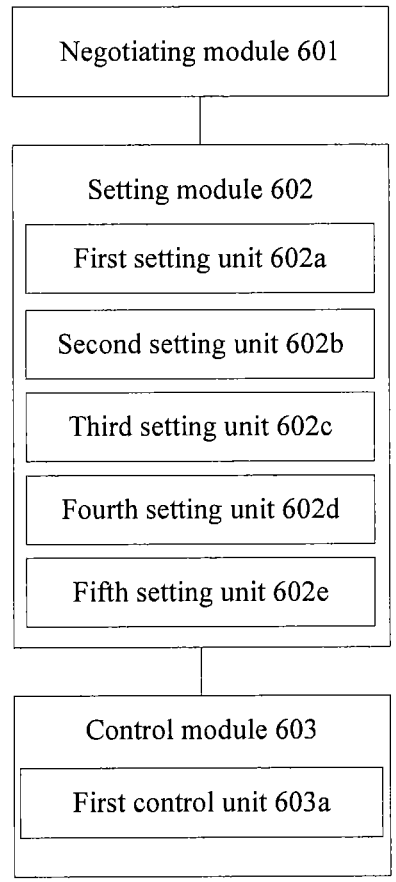
FIG. 20 is another schematic structural diagram of a local link control entity according to Embodiment 6 of the present invention.

As shown in FIG. 20, when the local congestion notification capability negotiated by the negotiating module 601 includes a capability of supporting a real-time transport protocol RTP local congestion notification mechanism, the setting module 602 includes a first setting unit 602*a*, a second setting unit 602*b*, or a third setting unit 602*c*.

The first setting unit 602*a* is configured to add the congestion identifier into a downlink real-time transport control protocol RTCP packet header when the local link congestion is uplink local link congestion;

The second setting unit 602*b* is configured to add the congestion identifier and an uplink identifier into an IP packet header of downlink RTP or RTCP when the local link congestion is uplink local link congestion; and The third setting unit 602*c* is configured to add the congestion identifier and a downlink identifier into the IP packet header of the downlink RTP when the local link congestion is downlink local link congestion.

When the local congestion notification capability negotiated by the negotiating module 601 includes a capability of supporting a local congestion notification mechanism, where the mechanism uses a transmission control protocol (TCP) as a transport protocol, the setting module 602 includes a fourth setting unit 602d or a fifth setting unit 602e.

The fourth setting unit 602d is configured to add the congestion identifier into a downlink TCP acknowledgement ACK packet when the local link congestion is uplink local link congestion; and The fifth setting unit 602e is configured to add the congestion identifier and a downlink identifier into a downlink IP packet header that is based on a TCP application data packet when the local link congestion is downlink local link congestion.

The control module 603 includes:

a first control unit 603a, configured to perform downlink congestion control by increasing a buffer.

The local link control entity provided in this embodiment is based on the same conception as the local link control entity in the method embodiments. Reference may be made to the method embodiments for a specific implementation procedure, which is not repeatedly described here.

The local link control entity provided in this embodiment negotiates the local congestion notification capability with the local terminal; when the local link is congested between the local link control entity and the local terminal, the local link control entity sets the congestion identifier in the downlink data packet corresponding to the local congestion notification capability, and performs the congestion control according to the congestion identifier. In this way, an end-to-end congestion notification mechanism is freed from dependence on a network node or a remote terminal, the congestion notification mechanism can work all the time, and a problem of local congestion is solved more effectively.

Embodiment 7

Figure 21:
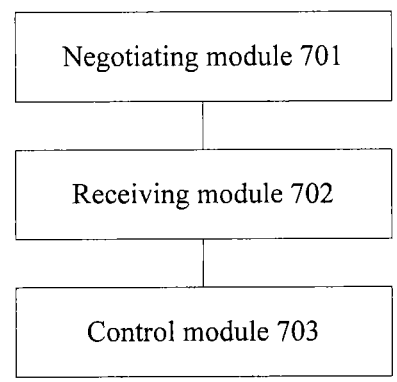
FIG. 21 is a schematic structural diagram of a terminal device according to Embodiment 7 of the present invention.

As shown in FIG. 21, this embodiment provides a terminal device, including:

a negotiating module 701, configured to negotiate a local congestion notification capability with a local link control entity;

a receiving module 702, configured to, when a local link to the local link control entity is congested, receive a downlink data packet which corresponds to the local congestion notification capability and is sent by the local link control entity, where the downlink data packet is set with a congestion identifier; and a control module 703, configured to perform congestion control on the local link according to the congestion identifier.

Figure 22:
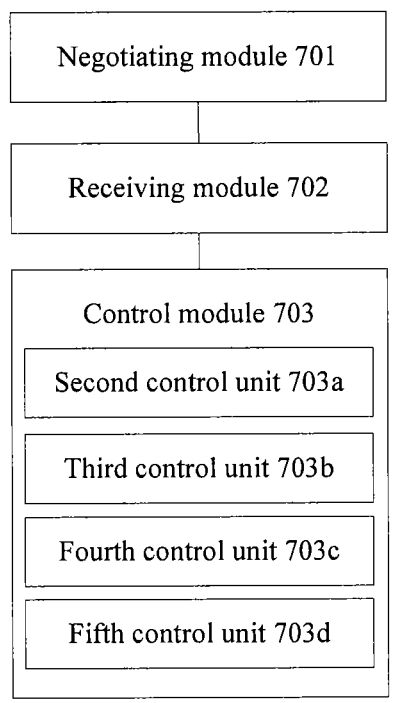
FIG. 22 is another schematic structural diagram of a terminal device according to Embodiment 7 of the present invention.

As shown in FIG. 22, when the local congestion notification capability negotiated by the negotiating module 701 includes a capability of supporting an RTP local congestion notification mechanism, the control module 703 includes a second control unit 703a or a third control unit 703b.

The second control unit 703a is configured to: when the local link congestion is uplink local link congestion, reduce a media sending rate, or, request a remote terminal to modify a media parameter so that its media sending rate is adjusted by modification of the media parameter; and The third control unit 703b is configured to: when the local link congestion is downlink local link congestion, request the remote terminal to modify the media parameter so as to adjust the media sending rate of the remote terminal; or, request a local media function entity to modify the media parameter of the media sent by the remote terminal so as to adjust the media sending rate of the remote terminal.

When the local congestion notification capability negotiated by the negotiating module 701 includes a capability of supporting a local congestion notification mechanism, where the mechanism uses TCP as a transport protocol, the control module 703 includes a fourth control unit 703c or a fifth control unit 703d.

The fourth control unit 703c is configured to reduce the sending rate in a congestion control manner of the TCP transport protocol when the local link congestion is uplink local link congestion; and The fifth control unit 703d is configured to: when the local link congestion is downlink local link congestion, if an end-to-end congestion control mechanism is set up with the remote terminal that communicates with it, add the congestion identifier into a TCP ACK packet so that the remote terminal reduces the sending rate after receiving the congestion identifier; if no end-to-end congestion control mechanism is set up with the remote terminal that communicates with it, reduce a TCP response rate to enable the remote terminal to reduce the sending rate.

The terminal device provided in this embodiment is based on the same conception as the local terminal in the method embodiments. Reference may be made to the method embodiments for a specific implementation procedure, which is not repeatedly described here.

The terminal device provided in this embodiment negotiates the local congestion notification capability with the local link control entity; when the local link is congested between the local link control entity and the local terminal, the local link control entity sets the congestion identifier in the downlink data packet corresponding to the local congestion notification capability, and the terminal device performs congestion control according to the congestion identifier. In this way, the end-to-end congestion notification mechanism is freed from dependence on a network node or the remote terminal, the congestion notification mechanism can work all the time, and a problem local congestion is solved more effectively. Moreover, downlink congestion control is performed by the media function entity to reduce dependence on a coding capability of the remote terminal.

All or part of the content in the technical solutions provided in the foregoing embodiments may be implemented by software programming, and its software program is stored in a readable storage medium such as a computer hard disk, a compact disk, or a floppy disk.

The foregoing descriptions are merely exemplary embodiments of the present invention, but are not intended to limit the present invention. Any modification, variation and equivalent replacement made without departing from the spirit and principle of the invention shall fall within the protection scope of the present invention.

What is claimed is:

1. A method for handling local link congestion, comprising:

locally determining, by a local link control entity, a local congestion notification capability with a local terminal;

setting a congestion identifier in a downlink data packet corresponding with the local congestion notification capability locally determined, when detecting a local link is congested between the local link control entity and the local terminal; and performing, by the local link control entity, congestion control on the local link in accordance with the congestion identifier, wherein the local congestion notification capability comprises: a capability of supporting a real-time transport protocol (RTP) local congestion notification mechanism;

the setting, by the local link control entity, the congestion identifier in the downlink data packet corresponding to the local congestion notification capability, comprises:
  adding, by the local link control entity, the congestion identifier into a downlink real-time transport control protocol (RTCP) packet header when the local link congestion is uplink local link congestion;
  adding, by the local link control entity, the congestion identifier and an uplink identifier into an IP packet header of downlink RTP packet or RTCP packet when the local link congestion is uplink local link congestion;
  or, adding, by the local link control entity, the congestion identifier and a downlink identifier into the IP packet header of downlink RTP packet when the local link congestion is downlink local link congestion.

2. The method according to claim 1, wherein:
the local congestion notification capability comprises: a capability of supporting a local congestion notification mechanism, where the mechanism uses a transmission control protocol (TCP) as a transport protocol;
the setting, by the local link control entity, the congestion identifier in the downlink data packet corresponding to the local congestion notification capability, comprises:
  adding, by the local link control entity, the congestion identifier into a downlink TCP acknowledgement ACK packet when the local link congestion is uplink local link congestion;
  or, adding, by the local link control entity, the congestion identifier and a downlink identifier into an IP packet header that is based on a TCP application packet when the local link congestion is downlink local link congestion.

3. The method according to claim 1, wherein:
the local congestion notification capability comprises: a capability of supporting an RTP local congestion notification mechanism;
the local link congestion is downlink local link congestion; and
the performing, by the local link control entity, the congestion control on the local link, comprises: performing, by the local link control entity, downlink congestion control by increasing a buffer.

4. A method for handling local link congestion, comprising:
  locally determining, by a local terminal, a local congestion notification capability with a local link control entity;
  receiving a downlink data packet sent by the local link control entity when detecting a local link is congested between the local terminal and the local link control entity, wherein a congestion identifier corresponding with the local congestion notification capability locally determined is set in the downlink data packet; and
  performing, by the local terminal, congestion control on the local link according to the congestion identifier,
  wherein the local congestion notification capability comprises: a capability of supporting an RTP local congestion notification mechanism;
  the performing, by the local terminal, the congestion control on the local link according to the congestion identifier, comprises:
    when the local link congestion is uplink local link congestion, reducing, by the local terminal, a media sending rate, or, requesting, by the local terminal, a remote terminal to modify a media parameter, so that its media sending rate is adjusted by a procedure of the modification of the media parameter; or
    when the local link congestion is downlink local link congestion, requesting, by the local terminal, the remote terminal to modify the media parameter so as to adjust a media sending rate of the remote terminal; or, requesting, by the local terminal, a local media function entity to modify the media parameter of media sent by the remote terminal so as to adjust the media sending rate of the remote terminal.

5. The method according to claim 4, wherein:
the local congestion notification capability comprises: a capability of supporting a local congestion notification mechanism, where the mechanism uses TCP as a transport protocol;
the performing, by the local terminal, the congestion control on the local link according to the congestion identifier, comprises:
  reducing, by the local terminal, a sending rate in a congestion control manner of a TCP transport protocol when the local link congestion is uplink local link congestion; or
  when the local link congestion is downlink local link congestion, if an end-to-end congestion control mechanism is set up between the local terminal and a remote terminal that communicates with it, adding, by the local terminal, the congestion identifier into a TCP ACK packet so that the remote terminal reduces a sending rate after receiving the congestion identifier; if no end-to-end congestion control mechanism is set up between the local terminal and the remote terminal that communicates with it, reducing, by the local terminal, a TCP response rate to enable the remote terminal to reduce the sending rate.

6. A local link control entity, comprising:
  a negotiating module, configured to locally determine a local congestion notification capability with a local terminal;
  a setting module, configured to set a congestion identifier in a downlink data packet corresponding with the local congestion notification capability locally determined, when detecting a local link to the local terminal is congested; and
  a control module, configured to perform congestion control on the local link in accordance with the congestion identifier,
  wherein the local congestion notification capability determined by the negotiating module comprises: a capability of supporting a real-time transport protocol (RTP) local congestion notification mechanism;
  the setting module comprises a first setting unit, a second setting unit, or a third setting unit;
  the first setting unit is configured to add the congestion identifier into a downlink real-time transport control protocol (RTCP) packet header when the local link congestion is uplink local link congestion;
  the second setting unit is configured to add the congestion identifier and an uplink identifier into an IP packet header of downlink RTP or RTCP when the local link congestion is uplink local link congestion; and
  the third setting unit is configured to add the congestion identifier and a downlink identifier into an IP packet header of downlink RTP when the local link congestion is downlink local link congestion.

7. The local link control entity according to claim 6, wherein:
the local congestion notification capability determined by the negotiating module comprises a capability of supporting a local congestion notification mechanism, where the mechanism uses a transmission control protocol (TCP) as a transport protocol, the setting module comprises a fourth setting unit or a fifth setting unit;

the fourth setting unit is configured to add the congestion identifier into a downlink TCP acknowledgement ACK packet when the local link congestion is uplink local link congestion; and the fifth setting unit is configured to add the congestion identifier and a downlink identifier into a downlink IP packet header that is based on a TCP application packet when the local link congestion is downlink local link congestion.

8. The local link control entity according to claim 6, wherein the control module comprises:

a first control unit, configured to perform downlink congestion control by increasing a buffer.

9. A terminal device, comprising:

a negotiating module, configured to locally determine a local congestion notification capability with a local link control entity;

a receiving module, configured to receive a downlink data packet sent by the local link control entity when detecting a local link to the local link control entity is congested, wherein a congestion identifier corresponding with the local congestion notification capability locally determined is set in the downlink data packet; and a control module, configured to perform congestion control on the local link according to the congestion identifier, wherein the local congestion notification capability determined by the negotiating module comprises: a capability of supporting an RTP local congestion notification mechanism;

the control module comprises a second control unit or a third control unit;

the second control unit is configured to: when the local link congestion is uplink local link congestion, reduce a media sending rate, or, request a remote terminal to modify a media parameter so that its media sending rate is adjusted by a procedure of the modification of the media parameter; and the third control unit is configured to: when the local link congestion is downlink local link congestion, request the remote terminal to modify the media parameter so as to adjust a media sending rate of the remote terminal; or, request a local media function entity to modify the media parameter of the media sent by the remote terminal so as to adjust the media sending rate of the remote terminal.

10. The terminal device according to claim 9, wherein:

the local congestion notification capability determined by the negotiating module comprises: a capability of supporting a local congestion notification mechanism, where the mechanism uses TCP as a transport protocol;

the control module comprises a fourth control unit or a fifth control unit;

the fourth control unit is configured to reduce a sending rate in a congestion control manner of a TCP transport protocol when the local link congestion is uplink local link congestion; and the fifth control unit is configured to: when the local link congestion is downlink local link congestion, if an end-to-end congestion control mechanism is set up with a remote terminal that communicates with it, add the congestion identifier into a TCP ACK packet, so that the remote terminal reduces a sending rate after receiving the congestion identifier; if no end-to-end congestion control mechanism is set up with the remote terminal that communicates with it, reduce a TCP response rate to enable the remote terminal to reduce the sending rate.

* * * * *